US006256632B1

(12) United States Patent
Fraenkel et al.

(10) Patent No.: US 6,256,632 B1
(45) Date of Patent: Jul. 3, 2001

(54) METHOD AND SYSTEM FOR ENABLING DYNAMIC CACHE STRUCTURES IN A NETWORKED ENVIRONMENT

(75) Inventors: Michael L. Fraenkel, Raleigh; Binh Q. Nguyen, Cary; Sandeep Kishan Singhal, Raleigh, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/027,118

(22) Filed: Feb. 17, 1998

(51) Int. Cl.[7] .................................................. G06F 9/00
(52) U.S. Cl. ........................................ 707/10; 707/3
(58) Field of Search ........................................ 707/1–206

(56) References Cited

U.S. PATENT DOCUMENTS 5,737,758 * 4/1998 Mathew ................................ 711/146
5,737,759 * 4/1998 Mathew ................................ 711/146
5,778,438 * 7/1998 Mathew ................................ 711/146

* cited by examiner

*Primary Examiner*—Thomas Black
*Assistant Examiner*—John G. Mills
(74) *Attorney, Agent, or Firm*—A. Bruce Clay; Myers Bigel Sibley & Sajovec, P.A.

(57) ABSTRACT

Methods, systems and computer program products are provided for managing shared data elements among a plurality of different client processes in a network environment. Shared data elements are associated with a Flow. A Flow is a logical stream of data that is only transmitted to a client process that explicitly subscribes for updates from the Flow. Update requests for the shared data elements are transmitted from client processes along the Flow so as to request the receipt of update notifications along the Flow. Update notifications are also transmitted about the shared data elements to the client processes along the Flow which have requested update notifications. Content of the shared data elements is, thereby, delivered to applications executing within said at least one client process which have requested updates of the shared data elements.

33 Claims, 6 Drawing Sheets

METHOD AND SYSTEM FOR ENABLING DYNAMIC CACHE STRUCTURES IN A NETWORKED ENVIRONMENT

FIELD OF THE INVENTION

This invention relates in general to computer software, and in particular to a method and system for managing shared state information in a network environment. More particularly, the present invention relates to a method and system by which a plurality of clients can flexibly determine which information is cached locally and which information is retrieved from a server.

BACKGROUND OF THE INVENTION

In real-time network computing environments, a plurality of hosts typically must share one or more pieces of dynamic information. This shared state might include traditional publish-subscribe data such as stock quotes or news headlines. It might include dynamic information, such as content of an HTML page. In collaborative environments, the shared information might simply describe the presence or absence of other pieces of shared information.

In most cases, this shared state is managed by a server host, and client hosts can update the state and learn about its current value. Such traditional client-server systems have used either full-caching or no-caching to implement distributed state management.

Full-caching systems replicate all shared data locally at all of the clients. Whenever the data changes, the server transmits an update notification to all of the clients informing them to update their local data caches. All client application requests to read data are consequently handled by accessing the local cache, thereby gaining low request-response latency at the cost of significant network bandwidth consumption whenever an update occurs. Existing protocols such as the Lotus Notification Service Transport Protocol (NSTP) and IBM Interactive Universe (InVerse) server employ this approach.

No-caching systems maintain no state locally at the client and rely on a server interaction to perform all client application read and write requests. These systems only transmit the data that is specifically needed by each client at the expense of slower application response time and at the risk of potentially transmitting the same information multiple times over the network to a client. Most World-Wide Web applications employ this approach.

These two techniques require the system to choose an extreme between high network bandwidth consumption and fast client response time. However, in many environments, neither of these extremes is desirable. This is particularly true in synchronous groupware systems that must simultaneously support interactive response time and manage considerable amounts of shared state. Previous systems that have attempted to merge these two extremes have simply opted to statically mark some data as fully-cached and mark the remaining data as non-cached. However, this hybrid approach does not account for the fact that different clients manipulate different information, meaning that each client demands a different prioritization of interactive response time and bandwidth consumption on each piece of shared information Therefore, a need exists for a method and system that supports partial caching of shared state information. Moreover, the decisions about what to cache should be made at run-time, so that a single system can support full-caching, no-caching, or any point in between these two extremes based on data update rates, client request rates, and available network and server resources.

SUMMARY OF THE INVENTION

An object of the present invention is to provide, within a network environment, a method for simultaneously supporting full-caching and no-caching semantics within a single system.

Another object of the present invention is to enable each element of shared data to employ different caching semantics at each host in the networked environment.

Yet another object of the present invention is to enable the caching semantics for each element of shared data at each host to be changed dynamically during the application's execution.

To achieve the foregoing objects and in accordance with the purpose of the invention as broadly described herein, a method and system are disclosed for flexibly managing the caching of shared data in a networked environment by using client-side data descriptors and data blocks. These and other features, aspects, and advantages of the present invention will become better understood with reference to the following description, appended claims, and accompanying drawings.

BRIEF DESCRIPTION OF THE DRAWINGS

For a more complete understanding of the present invention and for further advantages thereof, reference is now made to the following Detailed Description taken in conjunction with the accompanying drawings, in which.

DETAILED DESCRIPTION OF THE INVENTION

Figure 1:
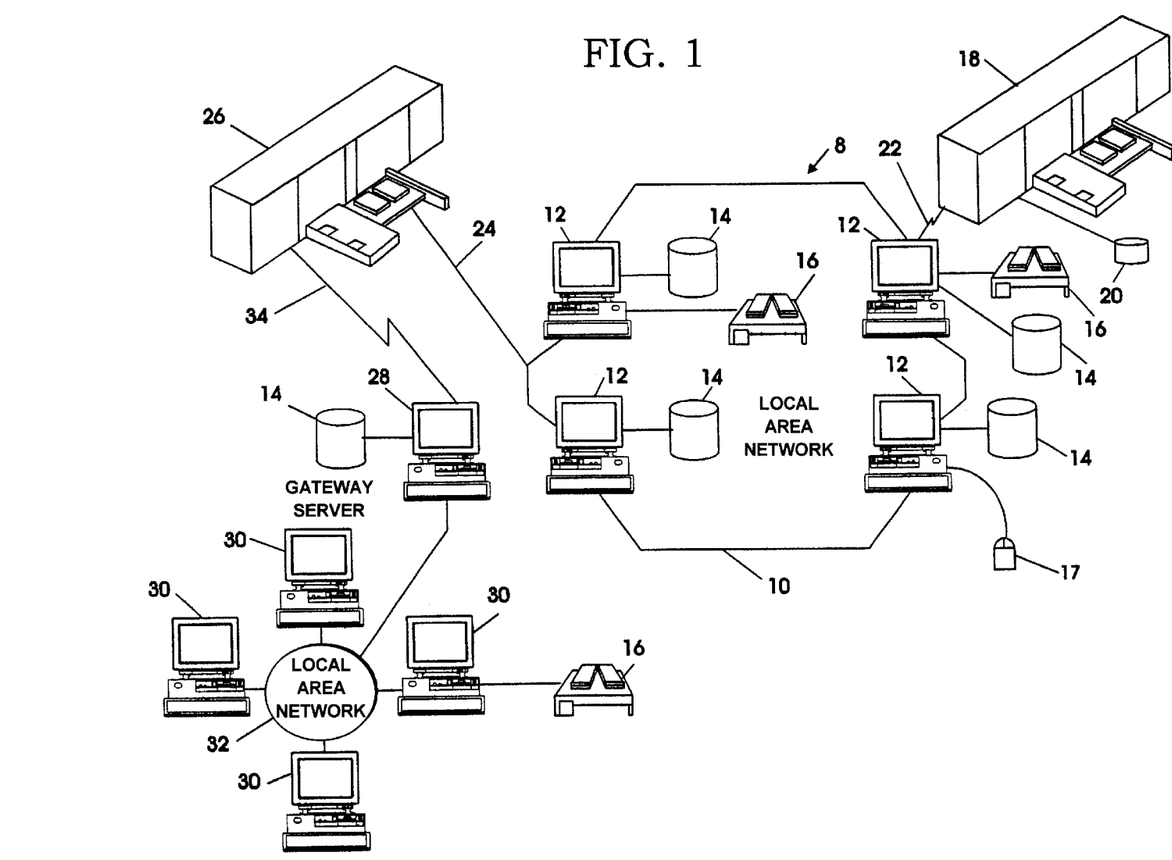
FIG. 1 is a pictorial representation of a data processing system which may be utilized to implement a method and system of the present invention.

Referring to FIG. 1, there is depicted a graphical representation of a data processing system 8, which may be utilized to implement the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network. Each said network may also consist of a plurality of processors coupled via a communications medium, such as shared memory, shared storage, or an interconnection network. As is common in such data processing systems, each individual computer may be coupled to a storage device 14 and/or a printer/output device 16 and may be provided with a pointing device such as a mouse 17.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a sub-system control unit/communications controller 26 and communications link 34 to a gateway server 28. The gateway server 28 is preferably an IWS which serves to link LAN 32 to LAN 10.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and similarly, LAN 10 may be located a substantial distance from LAN 32. For example, LAN 32 may be located in California while LAN 10 may be located within North Carolina and mainframe computer 18 may be located in New York.

Software program code which employs the present invention is typically stored in the memory of a storage device 14 of a stand alone workstation or LAN server from which a developer may access the code for distribution purposes, the software program code may be embodied on any of a variety of known media for use with a data processing system such as a diskette or CD-ROM or may be distributed to users from a memory of one computer system over a network of some type to other computer systems for use by users of such other systems. Such techniques and methods for embodying software code on media and/or distributing software code are well-known and will not be further discussed herein.

Figure 2:
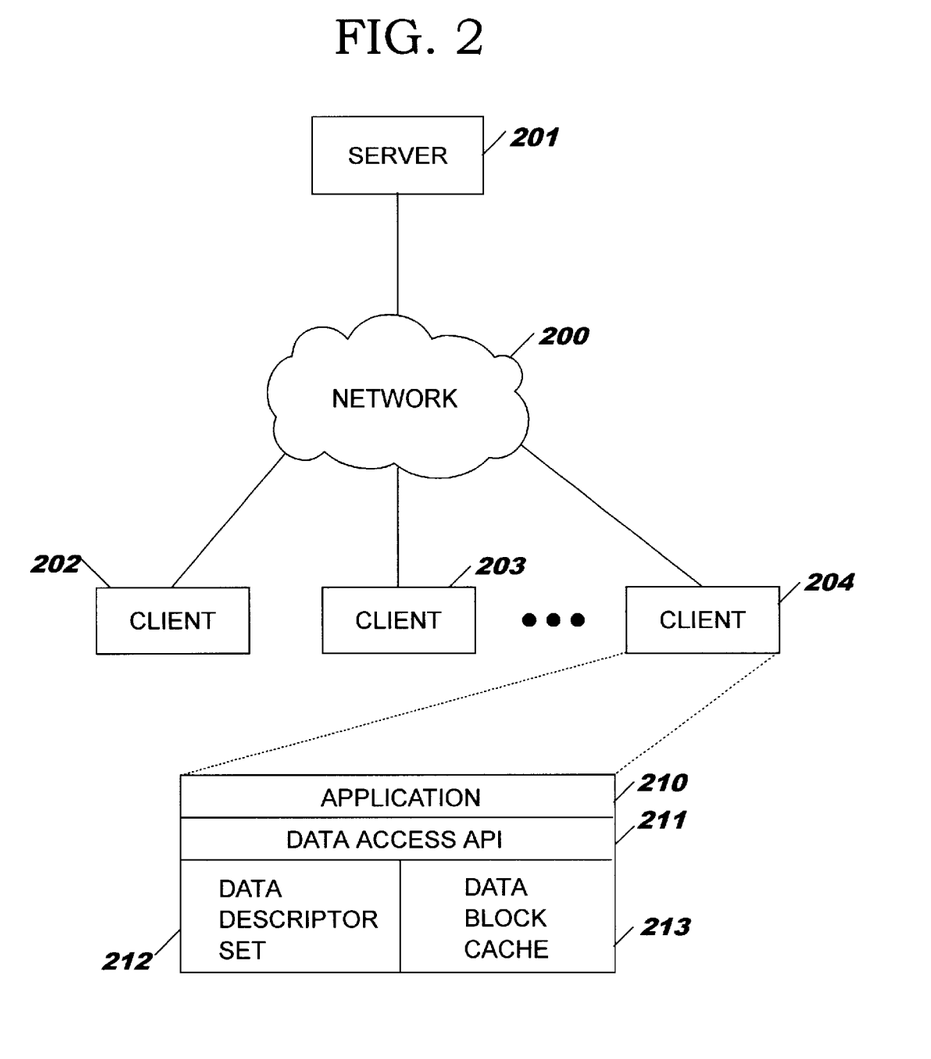
FIG. 2 illustrates a block diagram of system components that support the present invention.

Referring now to FIG. 2, components of a system that support the present invention are illustrated. A plurality of processes interact with a network 200. A designated server process 201 is responsible for managing shared data in this environment. The server process 201 maintains information about a set of shared data elements that are currently available for client access and records the current value of each of these data elements. The server process 201 may optionally provide additional services such as persistence, transactional updates, and access control. However, these additional services are well understood in the prior art and are not discussed further herein.

A plurality of client processes, indicated by reference numerals 202, 203, and 204, create, read, write, and delete shared data. Within each of these client processes 202, 203 and 204, an application 210 executes which employs a set of Data Access APIs (application programming interfaces) 211 for accessing and manipulating the set of shared data. Through these APIs, the application can create shared data elements, read the current values of shared data elements, update the values of shared data elements, subscribe for and receive notifications about changes to the values of shared data elements, and delete shared data. To support these Data Access APIs 211, each client process 202, 203 or 204 can access a set of Data Descriptors 212 and a Data Block Cache 213.

It is to be understood that no assumption is made about the physical location of the various client and server processes. For example, a single host machine may execute multiple processes concurrently. Indeed, all client processes 202, 203, and 204 may execute on the same machine as the server process 201, in which case communication over the network 200 would not be required.

Each element of shared data is associated with a logical construct called a Flow which represents a set of related network messages. In particular, the Flow carries all of the requests to update the associated data element, and it contains all of the confirmed updates to that data element. Each Flow is distinguished by a string name and a numeric ID. It is to be understood that although the present embodiment of the invention assigns both a string name and numeric ID to each Flow, in general, only one distinguishing identifier is required for each Flow.

Information about each shared data element is divided into two categories, namely the static data and the dynamic data. The static data comprises information that does not change during the data element's lifetime (from the time it is created to the time it is deleted). Such information, which is stored in a Flow Descriptor, includes the Flow's name, ID, and other user-defined properties. It is to be understood that alternative embodiments of this invention may designate other static information for each Flow. The dynamic data comprises information that may change during the data element's lifetime (from the time it is created to the time it is deleted). Such information, which is stored in a Flow Block, includes the data element's current value. It is to be understood that alternative embodiments of this invention may designate other dynamic information for each Flow.

Figure 3:
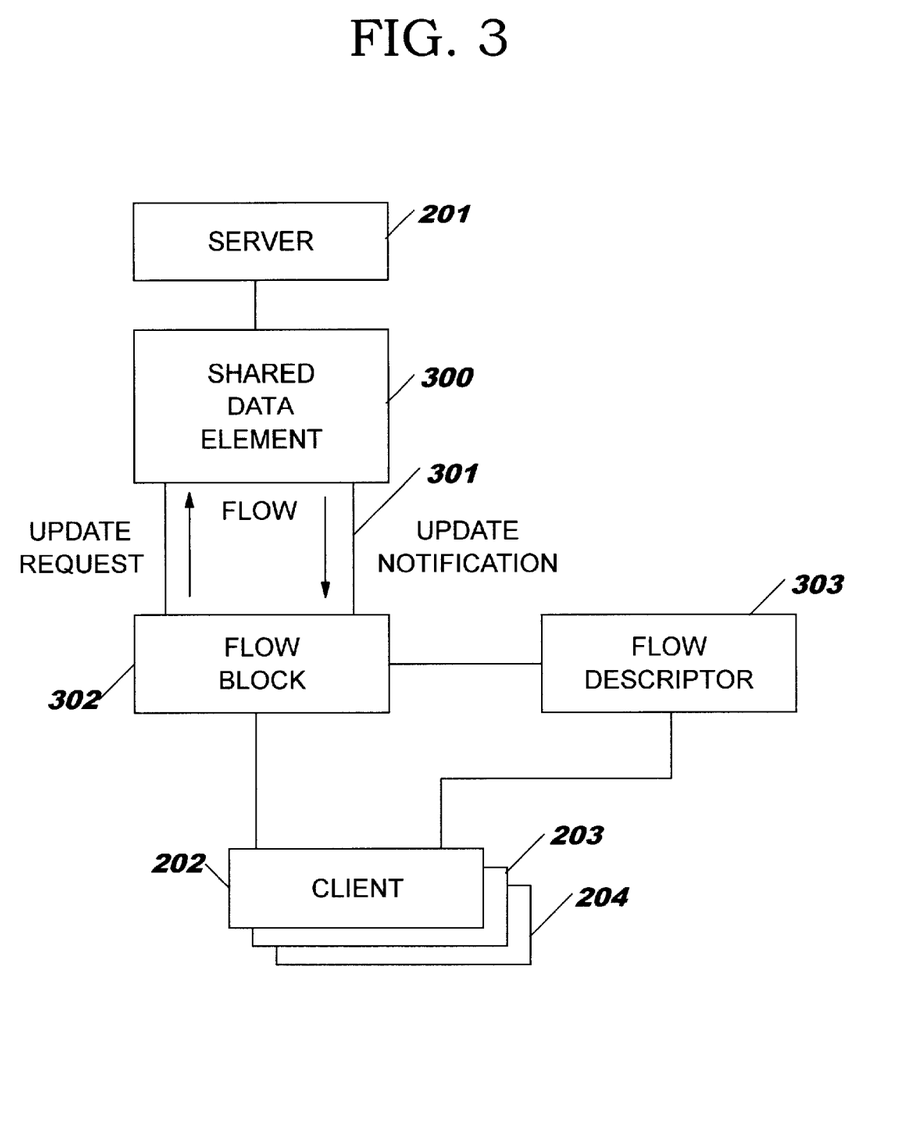
FIG. 3 illustrates the relationship between a shared data element, a Flow, a Flow Block, and a Flow Descriptor in accordance with the present invention.

FIG. 3 illustrates the relationship between a shared data element, a Flow, a Flow Descriptor and a Flow Block. A shared data element current value 300 is maintained by the server. Each data element current value 300 is associated with a flow 301 over which the server process 201 receives update requests from clients and transmits update notifications to clients. Each client process 202, 203 and 204 may optionally maintain a Flow Block 302 containing up-to-date information about the shared data element current value 300. Update notifications transmitted along the Flow 301 are applied to the Flow Block 302. In addition, each client process 202, 203 or 204 may also maintain a copy of a Flow Descriptor 303 for the Flow 301. The Flow Descriptor 303 is created at each client process 202, 203 or 204 when it first receives notification from the server process 201 of the existence of the Flow 301 and is deleted when the client process 202, 203 or 204 receives notification from the server process 201 that the Flow 301 has been destroyed.

The Flow 301 is a logical stream of data that is only transmitted to client processes that explicitly subscribe for updates therealong. A client may subscribe to the Flow 301 at any time and may unsubscribe from the Flow 301 at any time. Through these dynamic subscriptions, the client process 202, 203 or 204 determines whether the shared data element current value 300 is fully cached locally or whether it is not cached locally. In particular, if the client process 202, 203 or 204 subscribes to the Flow 301, then the client process 202, 203 or 204 can maintain an up-to-date local Flow Block 302. All read requests can be handled by accessing this local Flow Block 302. On the other hand, if the client process 202, 203 or 204 is not subscribed to the Flow 301, then the client cannot maintain the up-to-date local Flow Block 302. All read requests must be forwarded to the server process 201 for processing.

Figure 4:
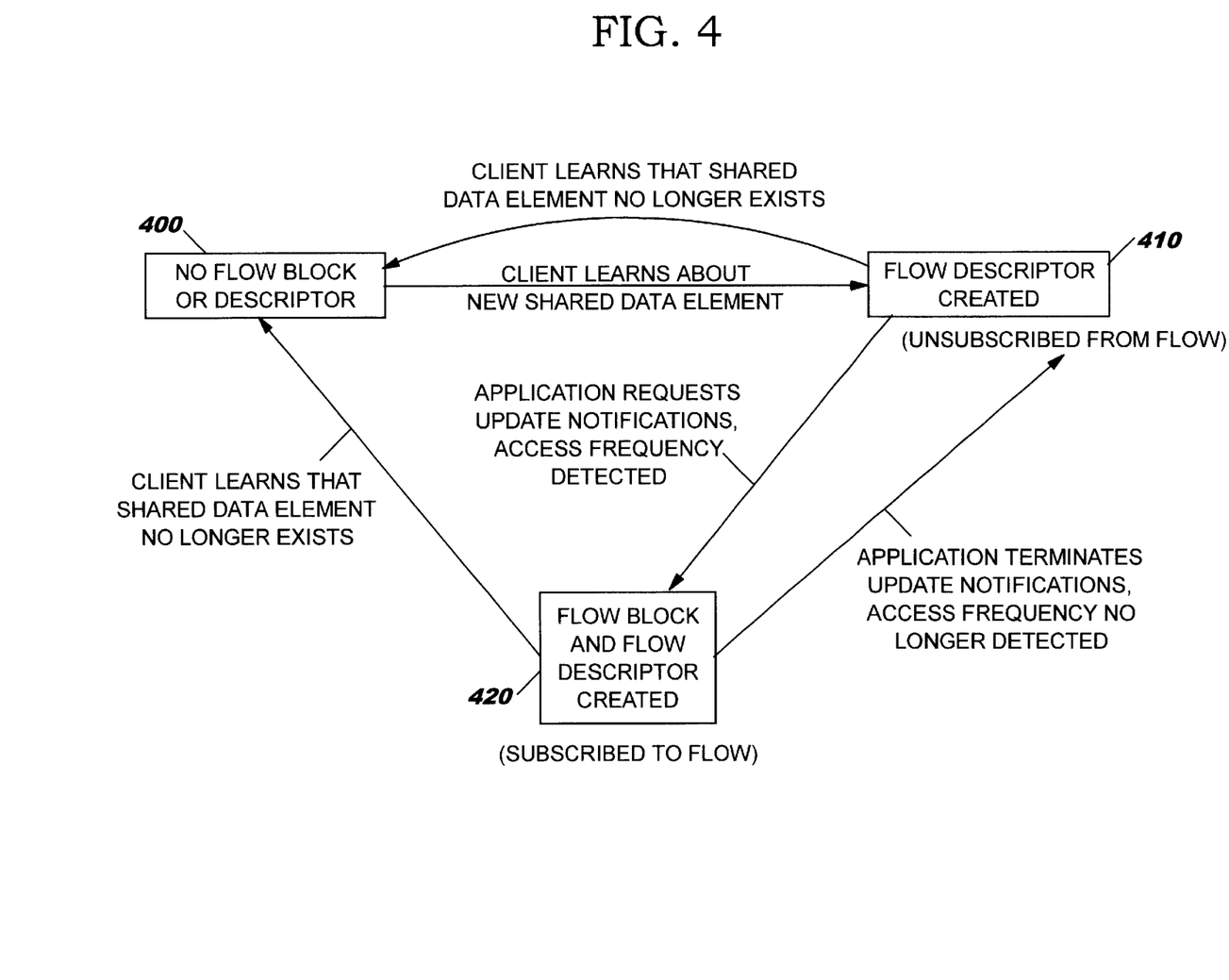
FIG. 4 illustrates how a client creates and destroys Flow Blocks and Flow Descriptors in accordance with the present invention.

Each client process 202, 203 and 204 creates and maintains Flow Blocks, such as Flow Block 302, and Flow Descriptors, such as Flow Descriptor 303, in accordance with the dynamic caching semantics assigned locally for the associated shared data element. FIG. 4 illustrates how these Flow Blocks and Descriptors are created and destroyed at each client. Initially, the client has neither a Flow Block nor a Flow Descriptor, as indicated by reference numeral 400. When the client receives notification from the server process of a new shared data element, it transitions to state 410 by retrieving the necessary information to create a Flow Descriptor.

At any time, the client application may request to receive notifications about updates to a particular shared data element. Alternatively, the Data Access APIs may detect that the application is frequently accessing a particular shared data element and that future accesses should, therefore, be handled from a local cache. In response, the client transitions to state 420 by subscribing to the Flow (by sending a message to the server) and creates a Flow Block for receiving shared data updates along the Flow.

At any time, the client application may request to no longer receive notifications about updates to a particular shared data element. Alternatively, the Data Access APIs may detect that the application is no longer frequently accessing a particular shared data element and that future accesses no longer need to be handled from a local cache. In response, the client may return to state 410 by unsubscribing to the Flow (by sending a message to the server) and destroying its Flow Block.

At any time, the client process may receive notification from the server process that a Flow no longer exists. In this case, the client transitions to state 400 by destroying both the Flow Block and Flow Descriptor.

Figure 5:
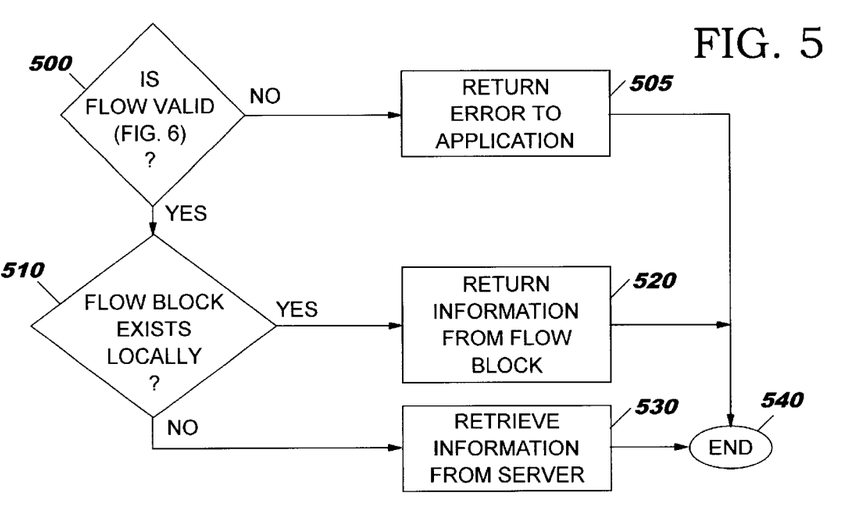
FIG. 5 illustrates a flow chart depicting how a client reads dynamic information about a shared data element in accordance with the present invention.

As previously indicated above, the presence of the Flow Block on a particular client determines the caching semantics for the associated shared data element. Referring to FIG. 5, a flowchart shows how a client delivers the current value of the dynamic information about a Flow in response to an application request through the Data Access API (the static information is accessed from the Flow Descriptor). At decision block 500, the client determines whether or not the Flow is valid, in accordance with a process to be subsequently discussed with reference to FIG. 6. If the answer to block 500 is no, then an error is returned to the application at block 505, and the procedure terminates at block 540. If the answer to block 500 is yes, then at decision block 510, it is determined whether or not a local Flow Block exists for the Flow (i.e. the client is currently in state 420 of FIG. 4). If the answer to decision block 510 is yes, then at block 520, the information is retrieved from the Flow Block and returned to the requesting application. The procedure then terminates at block 540. If the answer to decision block 510 is no, then at block 530, the information is retrieved by querying the server and is then returned to the requesting application. The procedure then terminates at block 540.

Flows are grouped by the server into Containers. Each Container is implemented as a Flow whose updates notify clients about the creation and deletion of other Flows (representing shared data elements) in that Container. Just as shared data element Flows are divided into Flow Descriptors and Flow Blocks, the Container Flow is also divided into a Container Descriptor and a Container Block. The Container Descriptor includes static information such as the Container's name, creator, etc. The Container Block includes dynamic information such as the list of currently active Flows in the Container. As with any other Flow, a client process may subscribe to and unsubscribe from the Container Flow (as shown in FIG. 4) based on an application request to be notified about the creation and deletion of shared data elements or based on an analysis of the application's access patterns.

Figure 6:
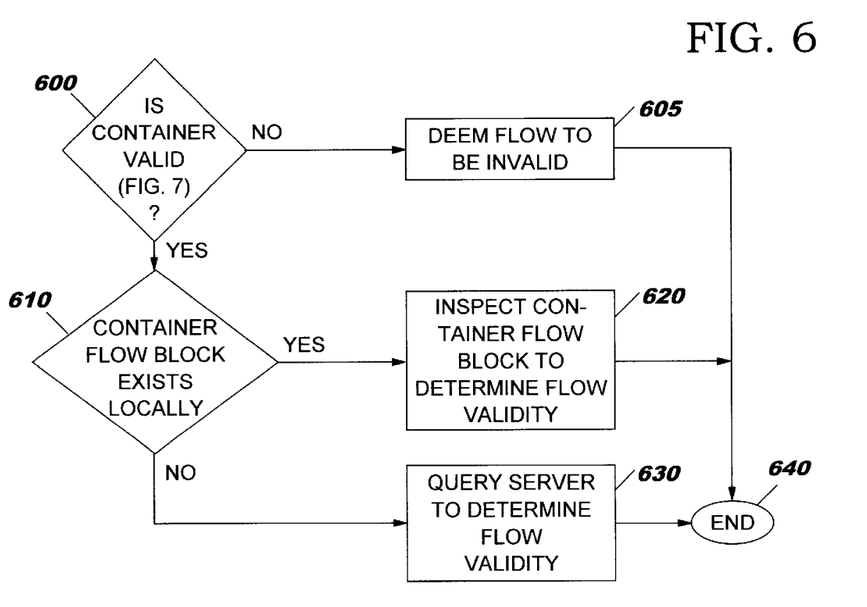
FIG. 6 illustrates a flow chart depicting how a client determines current validity of a Flow in accordance with the present invention.

Using information gathered from the Container Flow, the client can determine whether a selected shared data element Flow is presently active. FIG. 6 shows how the validity of a candidate Flow is determined. At decision block 600, it is determined whether or not the Container for the candidate Flow is valid, in accordance with a procedure to be subsequently described with reference to FIG. 7. If the answer to decision block 600 is no, then the candidate Flow is deemed to be invalid at block 605, and the procedure terminates at block 640. If the answer to decision block 600 is yes, then at decision block 610, it is determined whether or not a local Container Flow Block exists for the Container Flow. If the answer to decision block 610 is yes, then at block 620, the validity of the candidate Flow is determined by inspecting the Flow list contained in the Container Flow Block. The procedure then terminates at block 640. If the answer to decision block 610 is no, then at block 630, the server is queried for the candidate Flow's validity, and the procedure terminates at block 640.

Containers may themselves be aggregated into higher-level Containers. Notifications along such a high-level Container Flow notifies the client about the creation and destruction of member Containers (by way of creating and destroying the member Container Flows). At the root level, all Containers are descendants of a well-known Session Container that exists during the life span of the application. Applications can, therefore, always subscribe to the Session Container Flow to learn about the creation and destruction of top-level Containers. The validity of a Container is determined by recursively determining the validity of its associated Container Flow, in accordance with FIG. 6. However, the Session Container's validity is always assumed to be true.

Figure 7:
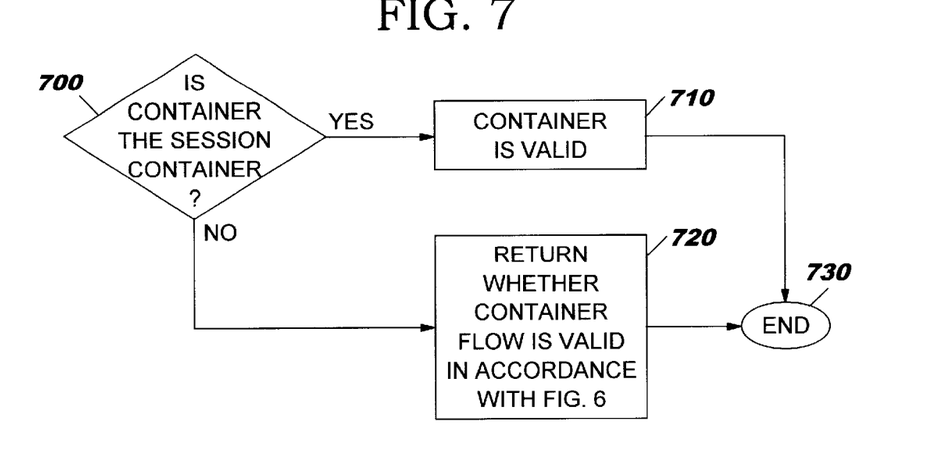
FIG. 7 illustrates a flow chart depicting how a client determines current validity of a Container in accordance with the present invention.

FIG. 7 is a flowchart showing how the validity of a Container is determined. At decision block 700, it is determined whether or not the Container is the Session Container. If the answer to decision block 700 is yes, then at block 710, the Container is deemed to be valid and the procedure terminates at block 730. If the answer to decision block 700 is no, then at block 720, the Container's validity is determined by determining the validity of its Container Flow, in accordance with the procedure of FIG. 6, and the procedure terminates at block 730.

It should be noted that, as described, the client may need to exchange multiple messages with the server to satisfy a particular application data access request. However, it is to be understood that alternative embodiments of the present invention may merge those multiple messages into a single server request (e.g. to verify multiple Container Flows at once).

As previously described above, an application may subscribe for notifications about the creation and destruction of Flows in a Container. In making this subscription, the application can designate that it wants to receive immediate notifications about all of the Flows that already exist in the Container. Such immediate notifications are known as "First Notifications." From the application's point of view, therefore, all of the existing Flows in the Container appear to have been created immediately after the application subscribes for notifications about future Flow creations.

Figure 8:
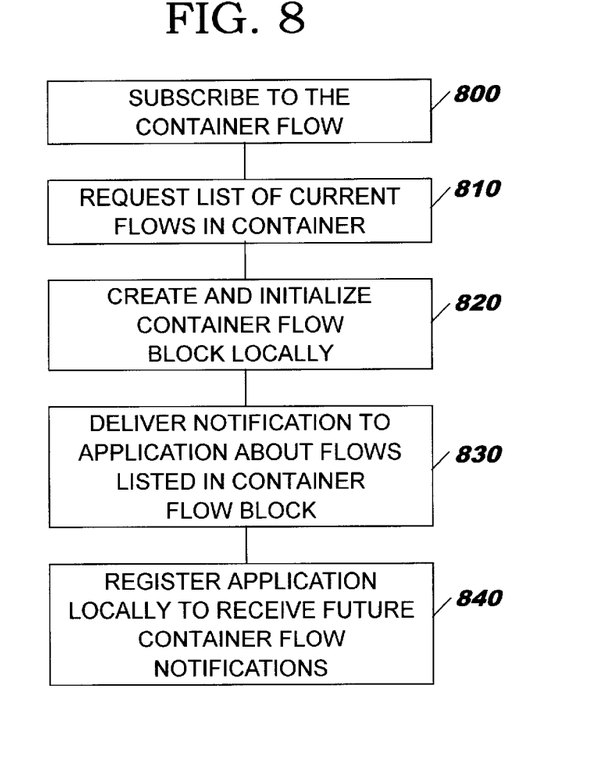
FIG. 8 illustrates a flow chart depicting how a client subscribes for Flow creation and destruction in a Container and receives consistent notifications about Flows that already exist in the Container.

In FIG. 8, a flowchart illustrates how a client process satisfies such a "First Notification" request for information about existing Flows in a Container. At block 800, the client process issues a Flow subscription request to the server. This request ensures that the client will receive all future notifications about Flow creation and destruction in the Container. After this request has succeeded, the client process requests a list of the current Flows in the Container at block 810 which is equivalent to a read request when the Container Flow Block does not yet exist locally. Upon receiving this list of Flows, the client creates and initializes a Container Flow Block at block 820. At block 830, the application receives notifications about all of the Flows listed in the newly created Container Flow Block. Finally, in block 840, the application is actually added to the local list of callbacks that should learn about future notifications received on the Container Flow. This delayed registration of the application callback ensures that in a concurrent system with partial caching, the application receives a consistent set of notifications about the Container's Flows.

With this combination of Flow Descriptors, Flow Blocks, Containers, and Container Flows, applications can share data in a flexible manner while dynamically changing the local caching semantics for each data element. Although Flows have been described within the context of shared data elements at the server, it is to be understood that alternative embodiments of the present invention may implement Flows that are not associated with shared data elements at the server. In this case, the Flow is simply a vehicle for delivering event notifications among client applications.

Although the present invention has been described with respect to a specific preferred embodiment thereof, various changes and modifications may be suggested to one skilled in the art and it is intended that the present invention encompass such changes and modifications as fall within the scope of the appended claims.

What we claim is:

1. A method of managing shared data elements among a plurality of different client processes in a network environment, comprising the steps of:

associating at least one of the shared data elements with a Flow, wherein the Flow is a logical stream of data that is only transmitted to ones of the client processes that explicitly subscribe for updates and comprises a Flow Descriptor and a Flow Block;

sending a notification about an existence of said Flow from a server process to the plurality of different client processes;

creating the Flow Descriptor at each one of the plurality of different client processes when each one of the plurality of different client processes receives notification about the existence of said Flow;

transmitting update requests for the at least one of the shared data elements from at least one client process along said Flow so as to request the receipt of update notifications along said Flow;

transmitting update notifications about the at least one of the shared data elements to said at least one client process along said Flow;

delivering a content of said at least one of the shared data elements to at least one application executing within said at least one client process.

2. The method of claim 1, further comprising the step of:

deleting said Flow Descriptor at each of the different client processes when each of the different client processes receives a notification from a server process that said Flow no longer exists.

3. The method of claim 2, further comprising the steps of:

each of the different client processes creating said Flow Block when each of the different client processes subscribes to said Flow;

applying delivered updates along said Flow to said Flow Block; and each of the different client processes deleting said Flow Block when said each of the different client processes unsubscribes to said Flow.

4. The method of claim 1, wherein said step of delivering a content of said each of the shared data elements comprises the steps of:

ensuring that said Flow is currently valid;

retrieving content of said each of the shared data elements locally to said each of the different client processes if said Flow Block has been created; and retrieving said content of said each of the shared data elements through a server if said Flow Block has not been created.

5. The method of claim 4, wherein said step of ensuring that said Flow is currently valid comprises the steps of:

ensuring validity of a Container within which said Flow was created;

retrieving content of dynamic state information associated with said Container; and determining whether said Flow is active within said Container.

6. The method of claim 5, wherein said step of ensuring validity of a Container comprises the steps of:

granting validity if said Container is a Session Container; and ensuring validity of a Container Flow associated with said Container.

7. The method of claim 1, wherein said Flow is associated with a Container, and wherein said Container is associated with a Container Flow.

8. The method of claim 7, further comprising the steps of:

transmitting update notifications about creation of a Flow along said Container Flow; and transmitting update notifications about deletion of a Flow along said Container Flow.

9. The method of claim 8, wherein said Container is part of a Container hierarchy whose root is a Session Container.

10. The method of claim 8, further comprising the step of:

subscribing for notifications of Flow creation and Flow destruction in said Container.

11. The method of claim 10, wherein said step of subscribing for notifications causes delivery of notifications about existing Flows in said Container and further comprises the steps of:

subscribing for notifications along said Container Flow;

retrieving a list of Flows currently in said Container;

creating a Container Flow Block;

delivering notifications about said Flows currently in said Container; and locally registering a callback for delivering future notifications.

12. A system for managing shared data elements among a plurality of different client processes in a network environment, comprising:

means for associating at least one of the shared data elements with a Flow, wherein the Flow is a logical stream of data that is only transmitted to ones of the client processes that explicitly subscribe for updates;

means for sending a notification about an existence of said Flow from a server process to the plurality of different client processes;

means for creating the Flow Descriptor at each one of the plurality of different client processes when each one of the plurality of different client processes receives notification about the existence of said Flow;

means for transmitting update requests for the at least one of the shared data elements from at least one client process along said Flow so as to request the receipt of update notifications along said Flow;

means for transmitting update notifications about the at least one of the shared data elements to said at least one client process along said Flow;

means for delivering a content of said at least one of the shared data elements to at least one application executing within said at least one client process.

13. The system of claim 12, further comprising:

means for deleting said Flow Descriptor at each of said client processes when each of said client processes receives a notification from a server process that said Flow no longer exists.

14. The system of claim 13, further comprising:

means for creating said Flow Block by each of said client processes when each of said client processes subscribes to said Flow;

means for applying delivered updates along said Flow to said Flow Block; and means for deleting said Flow Block by each of said client processes when each of said client processes unsubscribes to said Flow.

15. The system of claim 12, wherein said means for delivering a content of said each of the shared data elements comprises:

means for ensuring that said Flow is currently valid;

means for retrieving content of the shared data elements locally to each of said client processes if said Flow Block has been created; and means for retrieving said content of the shared data elements through a server if said Flow Block has not been created.

16. The system of claim 15, wherein said means for ensuring that said Flow is currently valid comprises:

means for ensuring the validity of a Container within which said Flow was created;

means for retrieving the content of dynamic state information associated with said Container; and means for determining whether said Flow is active within said Container.

17. The system of claim 16, wherein said means for ensuring the validity of a Container comprises:

means for granting validity to said Container if said Container is a Session Container; and means for ensuring the validity of the Container Flow associated with said Container.

18. The system of claim 12, wherein said each Flow is associated with a Container, and wherein said Container is associated with a Container Flow.

19. The system of claim 18, further comprising:

means for transmitting update notifications about the creation of a Flow along said Container Flow; and means for transmitting update notifications about the deletion of a Flow along said Container Flow.

20. The system of claim 19, wherein said Container is part of a Container hierarchy whose root is a Session Container.

21. The system of claim 19, further comprising:

means for subscribing for notifications about Flow creation and Flow destruction in said Container.

22. The system of claim 21, wherein said means for subscribing for notifications causes delivery of notifications about existing Flows in said Container and further comprises:

means for subscribing for notifications along said Container Flow;

means for retrieving a list of the Flows currently contained in said Container;

means for creating a Container Flow Block;

means for delivering notifications about said Flows current contained in said Container; and means for locally registering a callback for delivering future notifications.

23. A computer program product recorded on computer readable medium for managing shared data elements among a plurality of different client processes in a network environment, comprising:

computer readable means for associating at least one of the shared data elements with a Flow, wherein the Flow is a logical stream of data that is only transmitted to ones of the client processes that explicitly subscribe for updates;

computer readable means for sending a notification about an existence of said Flow from a server process to the plurality of different client processes;

computer readable means for creating the Flow Descriptor at each one of the plurality of different client processes when each one of the plurality of different client processes receives notification about the existence of said Flow;

computer readable means for transmitting update requests for the at least one of the shared data elements from at least one client process along said Flow so as to request the receipt of update notifications along said Flow;

computer readable means for transmitting update notifications about the at least one of the shared data elements to said at least one client process along said Flow;

computer readable means for delivering a content of said at least one of the shared data elements to at least one application executing within said at least one client process.

24. The program product of claim 23, further comprising:

computer readable means for deleting said Flow Descriptor at each of the different client processes when each of said client processes receives a notification from a server process that said Flow no longer exists.

25. The program product of claim 24, fuirther comprising:

computer readable means for creating said Flow Block by each of the different client processes when said each of the different client processes subscribes to said Flow;

computer readable means for applying delivered updates along said Flow to said Flow Block; and computer readable means for deleting said Flow Block by said each of the different client processes when said each of the different client processes unsubscribes to said Flow.

26. The program product of claim 23, wherein said computer readable means for delivering a content of said each of the shared data elements comprises:
- computer readable means for ensuring that said Flow is currently valid;
- computer readable means for retrieving content of said each of the shared data elements locally to said each of the different client process if said Flow Block has been created; and
- computer readable means for retrieving said content of said each of the shared data elements through a server if said Flow Block has not been created.

27. The program product of claim 26, wherein said computer readable means for ensuring that said Flow is currently valid comprises:
- computer readable means for ensuring validity of a Container within which said Flow was created;
- computer readable means for retrieving content of dynamic state information associated with said Container; and
- computer readable means for determining whether said Flow is active within said Container.

28. The program product of claim 27, wherein said computer readable means for ensuring validity of a Container comprises:
- computer readable means for granting validity if said Container is a Session Container; and
- computer readable means for ensuring validity of a Container Flow associated with said Container.

29. The program product of claim 23, wherein said Flow is associated with a Container, and wherein said Container is associated with a Container Flow.

30. The program product of claim 29, further comprising:
- computer readable means for transmitting update notifications about creation of a Flow along said Container Flow; and
- computer readable means for transmitting update notifications about deletion of a Flow along said Container Flow.

31. The program product of claim 30, wherein said Container is part of a Container hierarchy whose root is a Session Container.

32. The program product of claim 30, further comprising:
- computer readable means for subscribing for notifications of Flow creation and Flow destruction in said Container.

33. The program product of claim 32, wherein said computer readable means for subscribing for notifications causes delivery of notifications about existing Flows in said Container and further comprises:
- computer readable means for subscribing for notifications along said Container Flow;
- computer readable means for retrieving a list of Flows currently in said Container;
- computer readable means for creating a Container Flow Block;
- computer readable means for delivering notifications about said Flows currently in said Container; and
- computer readable means for locally registering a callback for delivering future notifications.

* * * * *